Nov. 7, 1961 R. A. DAVIS ET AL 3,008,029
MEANS AND METHOD FOR TESTING OF COMPOSITE
SANDWICH STRUCTURES
Filed June 7, 1957 4 Sheets-Sheet 1

INVENTORS
ROBERT A. DAVIS
CLAYTON D. LITTLE
DOWELL V. ALLEN
BY
*Walter J. Jason*
ATTORNEY Nov. 7, 1961  R. A. DAVIS ET AL  3,008,029
MEANS AND METHOD FOR TESTING OF COMPOSITE
SANDWICH STRUCTURES
Filed June 7, 1957  4 Sheets-Sheet 2
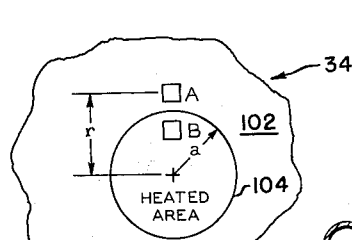
FIG. 9
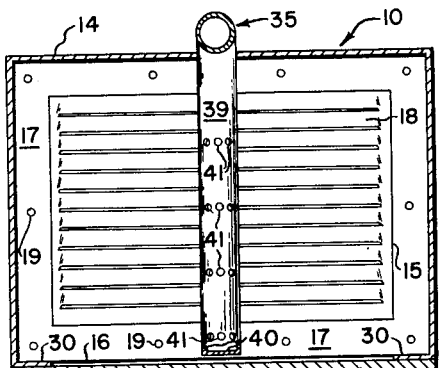
FIG. 4
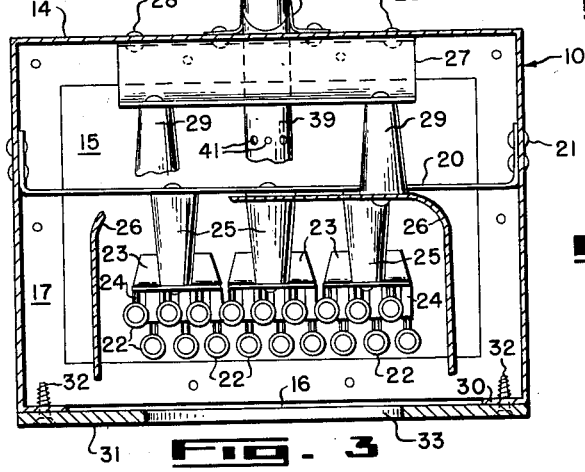
FIG. 3
FIG. 10a
FIG. 10b
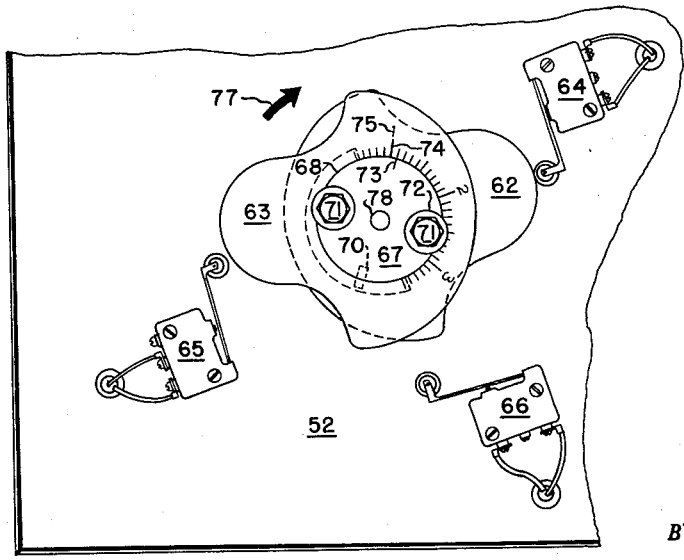
FIG. 5
INVENTORS
ROBERT A. DAVIS
CLAYTON D. LITTLE
DOWELL V. ALLEN
BY
ATTORNEY

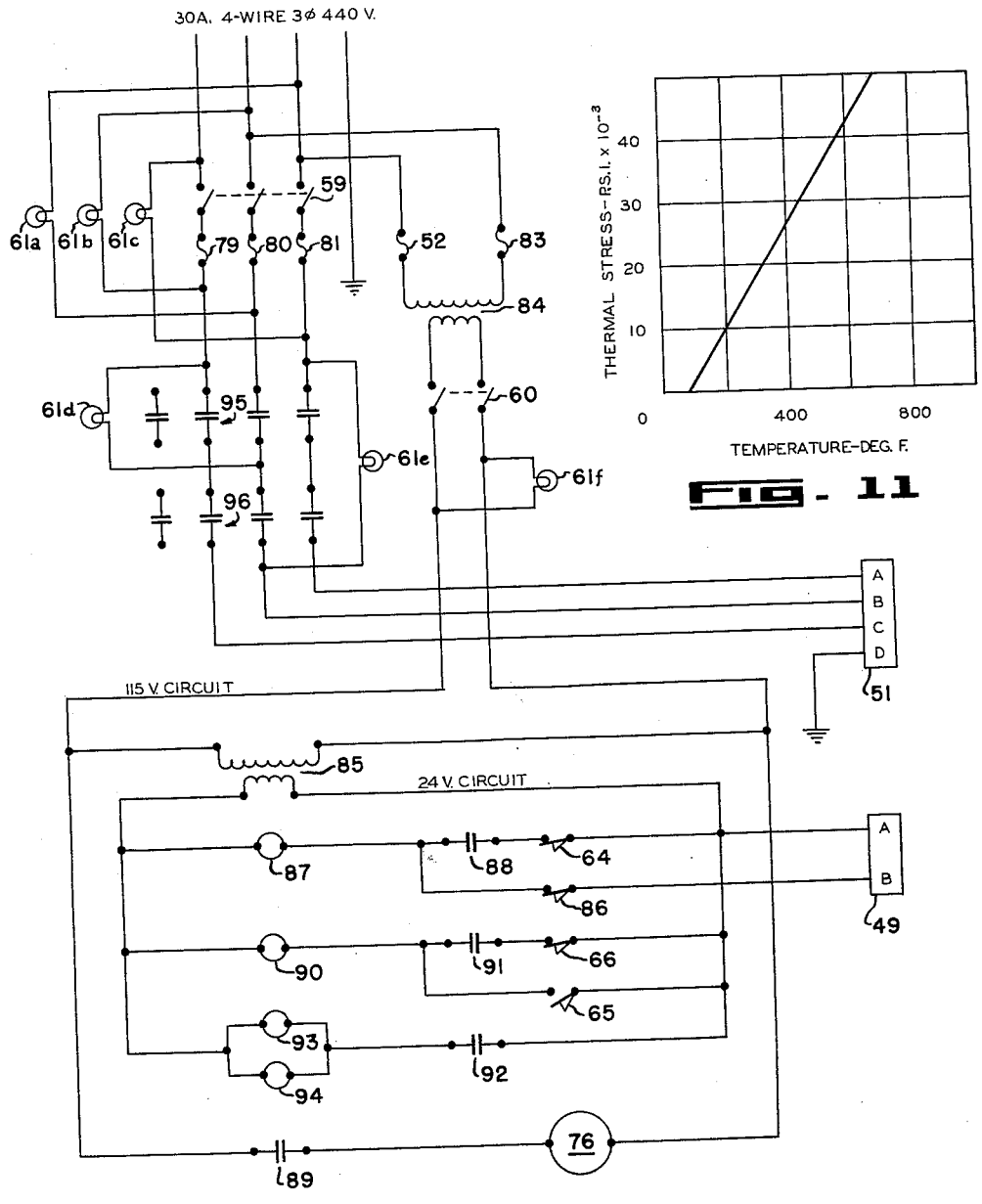

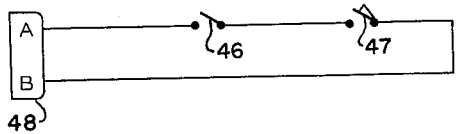
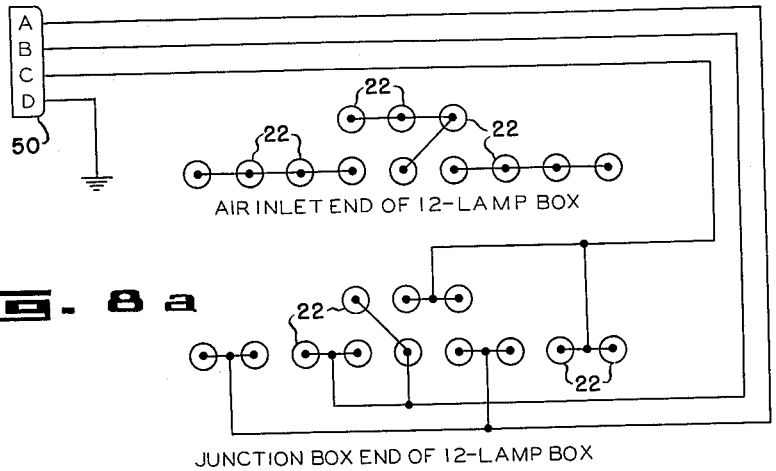
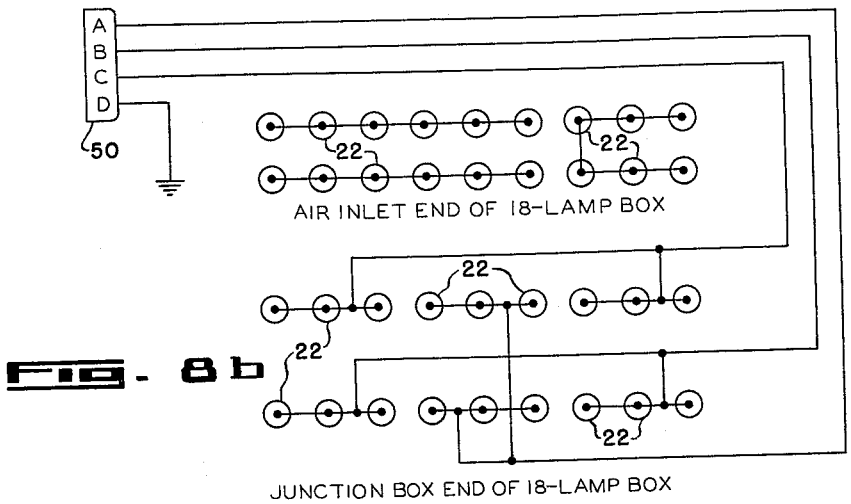

United States Patent Office 3,008,029
Patented Nov. 7, 1961

3,008,029
MEANS AND METHOD FOR TESTING OF COMPOSITE SANDWICH STRUCTURES
Robert A. Davis, Clayton D. Little, and Dowell V. Allen, Fort Worth, Tex., assignors to General Dynamics Corporation, San Diego, Calif., a corporation of Delaware
Filed June 7, 1957, Ser. No. 664,304
3 Claims. (Cl. 219—34)

This invention relates generally to means and methods for the non-destructive testing of composite or laminated structures. More particularly the invention relates to an improved testing process and related apparatus for determining the relative quality of any given joint in a brazed, welded or adhesively bonded composite structure, such as sandwich type cellular core constructions.

Cellular cored sandwich type structures have found particular application in the manufacture of present day aircraft and missiles, though, of course, their usage is not limited to these fields. Sandwich panel composite constructions are generally comprised of a low density core material of cellular or lattice work construction faced with sheet or plate panels and usually encompassed by peripheral edge closure members. Such components are integrally associated to effect a laminate type construction which is characterized by its inherent high strength/weight ratio and heat resistant qualities.

In general, two types of sandwich panel constructions are customarily fabricated for present day use in aircraft structure: one having a core (in the form of a honeycomb made of resin impregnated fiberglass, aluminum or of a phenolic) which is bonded or cemented to face plates and edge members made of suitable material such as plastic, impregnated fiberglass, or aluminum; the other having the same type of components but these components usually being of stainless steel or titanium and being brazed or welded together. The latter type is customarily employed in areas of high environmental temperatures and high stresses, where organic adhesives are inadequate for effective structural bonding. It should be readily apparent that the structural integrity of such sandwich or laminate type panel construction is dependent to a large degree upon the quality of the joint between the edges of the cellular core and the inner surfaces of the facing plates, as well as the quality of the joint between said facing panels and edge members.

Another type of structure which is commonly employed in the construction of modern aircraft and missiles is that of a beaded or otherwise integrally reinforced inner panel adhesively bonded or brazed to an outer panel. This type of structure frequently employs a cellular core or other low density material in the beaded or reinforced area, while the contiguous surfaces of the inner and outer panels are joined in a laminate manner. Similarly, the structural integrity of such a reinforced panel construction is dependent to a large degree upon the quality of the joint between these inner and outer panel components.

In bonded, brazed or welded materials and structures obviously it is desirable, particularly in the construction of aircraft and missiles, that the testing of the strength of adhered parts be effected in a non-destructive manner, and that a method be afforded for detection of a defective bond or braze that could contribute to premature bond or braze failure in the structural components which are joined together to form the composite structure. In a composite structure, it is essential that an optimum in physically strong, yet light-weight and rigid structure be achieved. This type of structure can never be safely accepted as structurally reliable for aircraft and missile use without some test to determine the condition of the bonded, brazed or welded joint.

Several types of testing apparatus and procedures have heretofore been employed for the inspection of such structures. However, such apparatus have generally been limited in their capabilities, since they are usually able to accurately detect only voids in the bonded, brazed or welded joint of a structure being tested. In general, different types of testing media are normally required for the inspection of adhesively bonded structures than for the inspection of brazed or welded structures, since testing media which are capable of detecting voids in bonded structures are usually inadequate for inspecting brazed or welded structures, and vice versa.

It has heretofore been the common practice to test adhesively bonded structures by means of well-known destructive test methods, and more recently and currently, by a non-destructive test method employing ultrasonically induced mechanical impedance. This latter method is comparative, based upon the interpretation of physical measurements, and serves only to indicate an apparently well-bonded joint, a sub-standard bonded joint, or a void area in such an adhesively bonded structure. An apparently well-bonded joint may be chemically contaminated unless extremely precise and sanitary assembly techniques have been rigidly adhered to, and hence, may fail at a lower level than the ultimate design stress. However, when a sub-standard bond area is detected in an adhesively bonded structure, there is no indication whatsoever of the actual strengthwise quality of the joint, other than that such bonded joint is below a standard. Such sub-standard bonded areas may result from any of several causes, such as insufficient or non-uniform distribution of heat and bonding pressure, excess of adhesive resulting in a spongy bond area, inadvertently prestressed face plates, etc.

Commonly accepted practices in testing brazed or welded structures are both by well-known destructive test methods, and by non-destructive testing with radiographic inspection. This latter method accurately detects physical discrepancies in an object structure by interpretation of the radiographic plate, such as void areas in the brazed joint, core damage, etc., and also indicates the relative size of the braze fillet. However, such physical indications are not conclusive of the strengthwise quality of the brazed joint, since an apparently well-quality of the brazed joint (indicated by a satisfactory braze fillet on a radiographic plate) may be chemically contaminated. Such contamination may occur in the high-temperature brazing process as a result of a contaminated brazing atmosphere or insufficient purging of the brazing vessel, non-adherence to precise and sanitary assembly techniques, etc. This contamination generally results in oxidation of the brazed surfaces, which effects a low-quality (strengthwise) brazed joint, not ordinarily detectable by radiographic inspection. Subjection of such a poorly brazed structure to a stress considerably below the design limit stress will generally fail the structure in the contaminated area by braze delamination. No suitable means for detecting contamination in an apparently well-brazed joint has heretofore been available, destructive testing having been the accepted conventional mode.

Accordingly, the present invention has been evolved to remedy the deficiencies of other strength testing devices and comprises a comparative method, together with apparatus, for inducing thermal stresses in the facing panel of an object structure, and relating such stresses to the condition of the bond, braze or weld employed to adhere the component parts together.

Although the testing means and method of the present invention are particularly directed toward determining the quality of a joint in adhesive bonded, brazed or welded structures, the apparatus and techniques employed in the present test procedure may be further qualified for "proof-testing" a laminate, sandwich or other type construction. Emphasis has been placed on failure of a structure through deficient properties of a bonded, brazed or welded joint, such causes having been heretofore mentioned, as contamination, etc., since the majority of structural failures generally occur at a joint. However, it should be readily apparent that structurally unreliable constructions of this general type may fail for other reasons, such as deficient or low-quality core material, or face panels or edge members which do not embody the required physical properties, etc., and in such instances, the testing means and method of the present invention serve to "proof-test" the object structure by causing the structure to fail at a lower level than the design stress if such deficiencies are existent in the object structure. With respect to brazed or welded structures, the testing means and method of the present invention may well be employed for operation in conjunction with radiographic inspection, to supplement rather than replace such inspection.

It is accordingly the primary object of the present invention to provide a means and method for non-destructively testing adhesive bond, braze or weld strength, or for the detection of a condition of an adhesive bond, braze or weld that could contribute to joint failure, in bonded, brazed or welded structures of laminate, sandwich, or other type construction.

Another object of the invention is to provide in a means and method, as above, in which bonded, brazed or welded structures which prove to be structurally reliable or non-destructively tested, while structurally unreliable constructions are destructively tested by bond, braze or weld delamination, or by partial crushing of the cellular core material and a usually well-pronounced indentation of the face panel therein, or failure of a component part of said structure being tested.

A further object of the invention is to provide an improved means and method for testing a composite or laminate structure whereby controlled thermal stresses, sufficiently below the yield stress of the material being tested, are induced in a face panel or laminate portion of a bonded, brazed or welded structure to determine the condition of the bond, braze or weld, and the physical strengthwise quality of the object structure undergoing test.

Still another object of the present invention is to provide a means and method of the above class and character which employs light-weight portable equipment and is well suited to production inspection techniques in serving its intended purpose, due to its simplicity and rapidity of operation.

Other objects and features of the present invention will be readily apparent to those skilled in the art from the following specification and appended drawings, wherein is illustrated a preferred form of the invention, and in which:

FIGURE 3 is a transverse detailed sectional view through the center of the heater unit, as taken along the line III—III in FIGURE 2.

FIGURE 4 is a transverse detailed sectional view through the end of the heater unit, as taken along the line IV—IV in FIGURE 2.

FIGURE 5 is a fragmentary plan view of the control unit of the present apparatus, illustrating the timing mechanism, as taken along the line V—V in FIGURE 1.

FIGURE 6 is a wiring schematic of the control unit circuitry.

FIGURE 7 is a wiring schematic of the heater unit control circuit.

FIGURE 8a is a wiring schematic for one form of heater unit.

FIGURE 8b is a wiring schematic for another form of heater unit.

FIGURE 9 is a schematic view of a fragment of a test structure, illustrating the geometry involved in the calculation of thermally induced stresses in such structure.

FIGURE 10a is a schematic view in which any point on the surface of the test structure, outside the heated area, is represented, illustrating the principal stresses acting on such point.

FIGURE 10b is a schematic view in which any point on the surface of the test structure, within the heated area, is represented, illustrating the principal stresses acting on such point; and FIGURE 11 is a typical graphical representation of the thermal stresses induced in a test structure by the application of heat thereto, wherein said thermal stresses are plotted against temperature.

Figure 1:
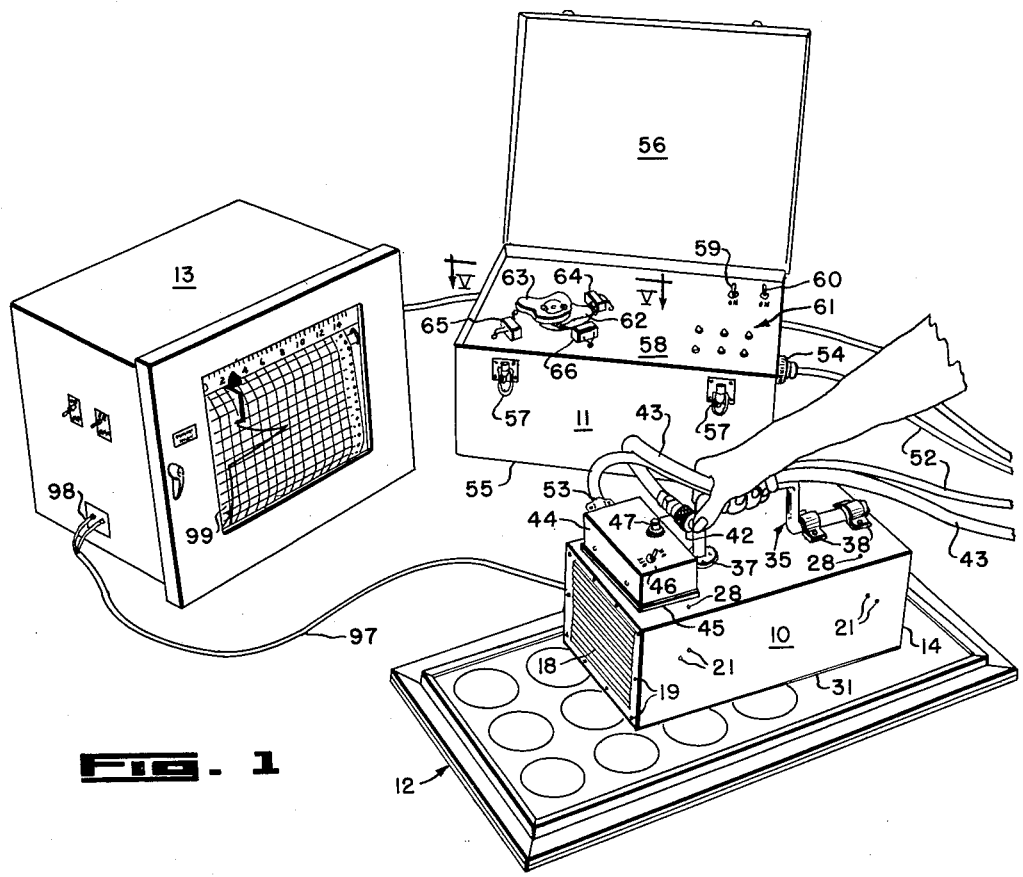
FIGURE 1 is a pictorial exemplification of an apparatus embodying the invention, shown in connection with a standard specimen or comparator.

The present invention resides in an improved means and method for non-destructively testing adhesively bonded, brazed or welded structures which prove to be structurally reliable, but which further serves as a destructive test for such bonded, brazed or welded structures which are structurally unreliable, and which means and method involves inducing thermal stresses in a structure to be tested and determining the effects thereof.

The present invention involves the theory of elasticity, according to which theory whenever the expansion or contraction that would normally result from the heating or cooling of a body is prevented, stresses are developed that are called thermal or temperature stresses. It is convenient to distinguish two different sets of circumstances under which thermal stresses occur, viz.: (a) The form of the body and the temperature conditions are such that there would no stresses except for the constraint of external forces. In any such instance, the stresses may be found by determining the shape and dimensions the body would assume if unconstrained, and then calculating the stresses produced by forcing it back to its original shape and dimensions. (b) The form of the body and the temperature conditions are such that stresses are produced in the absence of external constraint solely because of the incompatibility of the natural expansions or contractions of the different parts of the body. The principle of the present invention is based upon this latter circumstance (b).

In accordance with this theory, the modulus of elasticity E and the coefficient of thermal expansion $\alpha$ are assumed to be constant for the temperature range involved, and the increment or difference in temperature, $\Delta T$, is assumed to be positive. A thin plate at uniform temperature has the temperature changed $\Delta T$ throughout a comparatively small central circular portion of radius "a" (FIGURE 9). At any point B within the heated area (FIGURES 9 and 10b), there are induced radial ($\sigma_r$) and tangential ($\sigma_t$) compressive stresses:

$$\sigma_r = \sigma_t = \tfrac{1}{2} \Delta T \alpha E \qquad (1)$$

At any point A outside the heated area and distant "r" from the center of said heated area (FIGURES 9 and 10a), radial compressive and tangential tensile stresses are induced:

$$\sigma_r = \tfrac{1}{2} \Delta T \alpha E \left(\frac{a}{r}\right)^2 \qquad (2)$$

$$\sigma_t = -\tfrac{1}{2} \Delta T \alpha E \left(\frac{a}{r}\right)^2 \qquad (3)$$

At the edge of the heated portion (where $a=r$, in FIGURE 9), there is induced a maximum shear stress:

$$\tau_{max} = \tfrac{1}{2} \Delta T \alpha E \qquad (4)$$

In a typical sandwich panel type construction, the induced stresses in a face plate may be explained briefly in the following manner: The circular heated area attempts to expand radially. This expansion is partially restrained by the surrounding portion of the plate which is at a substantially lower temperature level. Therefore, with a temperature differential between the two areas, a point on the circumference of the original heated area will be displaced a greater distance from the center of the circular heated area, but not as far as it otherwise would during free expansion. The resultant situation may be compared to a press-fit, in that radial compressive stresses are induced in the heated area.

Referring now to FIGURE 1 of the drawings, there is illustrated a physical embodiment of the invention in a portable heater unit 10, its related control unit 11, a reference calibration specimen or comparator 12 of sandwich construction, and a tmperature recording device 13.

Heater unit 10 may assume a construction as illustrated in FIGURES 1 through 4. Heater unit 10 embodies a housing 14 fabricated of sheet metal as a rectangular box-like structure, open at the ends and bottom, as respectively indicated by the reference characters 15 and 16 in FIGURE 3. The openings 15 at each end of housing 14 are each circumscribed by an integral peripheral flange 17 (FIGURES 3 and 4), each flange adapted for the attachment thereto of a louvered plate 18 (FIGURES 1, 2 and 4) by suitable fastening means, such as self-tapping screws 19 engaging flanges 17. These louvered plates 18 permit unrestricted flow of coolant air through the heater unit 10, as will be hereinafter described.

A transversely disposed bracket 20 (FIGURE 3) is provided adjacent each end of housing 14, being fixedly attached to the sides thereof by suitable fastening means 21 to effect a support for a plurality of heater lamps or elements 22 employed in heater unit 10. The number of heater elements 22 employed in a heater unit 10 may vary, being dependent upon the heat requirement for a particular application. FIGURES 8a and 8b respectively illustrate wiring schematics for two typical lamp arrangements, one for a 12-lamp and the other for an 18-lamp heater unit 10, which may accordingly be respectively referred to as "light-duty" and "medium-duty" heater units 10, or "medium-duty" and "heavy-duty," dependent upon the lamp wattage. FIGURE 3 illustrates a heater unit 10 employing 18 lamps. Heat lamps 22 are preferably of the infrared type, such as commercially available GE 500W T3 or GE 1000W T3, quartz-envelope, tungsten-filament infrared lamps, so that a sufficient quantity of said lamps 22, arranged in a suitable manner, is adapted to effect a rapid temperature rise in the test area, as on the order of 500° F. per second. These heater lamps 22 are employed in varying multiples per unit 10, dependent upon the lamp wattage and operating voltage required, such as in multiples of six with 500 w.–115 v. lamps 22, or in multiples of three with 1000 w.–230 v. lamps 22, said lamps 22 being arranged longitudinally in a single bank or in tiers, or in crisscrossed tiers, for optimum efficiency.

Each support bracket 20 (FIGURE 3) has suspended therefrom one or more mounting brackets 23, which brackets 23 are provided with suitable clips or socket means 24 for the attachment of heat lamps 22 thereto. The 18-lamp heater unit 10 shown in FIGURE 3 employs three such brackets 23 on each transverse bracket 20, each bracket 23 having six sockets 24 attached thereto and alternately arranged in their vertical disposition, so that two nine-lamp tiers of heat lamps 22 are longitudinally mounted in the lower central portion of heater unit 10. Sockets 24 are electrically insulated from mounting brackets 23 and brackets 23 are rigidly positioned in spaced relationship to bracket 20 by means of spacing elements 25. These spacing elements 25 preferably are of ceramic composition and primarily serve as safety means to assure the electrical isolation of heat lamps 22 and their associated wiring from the housing 14, and further, are of such composition to readily withstand the elevated operating temperatures without warpage or breakage.

A longitudinally extending reflector 26 is provided within housing 14 to direct the radiant heat energy downwardly. This reflector 26 is also fabricated of sheet metal, and has its inner surface polished to a high luster for maximum efficiency. Transversely extending brackets 27, attached to the underside of the top of housing 14 by suitable fastening means 28, provide support means from which reflector 26 hangs. Reflector 26 is generally U-shaped in its cross-sectional configuration, being adapted to embrace the filament portion of heat lamps 22 on three sides as shown, and further, has a longitudinal extent substantially equal to the distance between brackets 20. The sides of reflector 26 do not extend to the bottom of housing 14, but preferably terminate a short distance above said surface, to provide space for complete circulation of coolant air, as will be later described. Reflector 26 is suspended from brackets 27 in a rigid and spaced manner by means of ceramic spacing elements 29, which are identical to spacing elements 25 heretofore described, both in function and construction.

The opening 16 at the bottom of housing 14 is defined by an integral and inwardly disposed peripheral flange 30 (FIGURES 3 and 4), adapted for the attachment of a shielding plate 31 to the bottom of housing 14 by a suitable fastening means, such as with self-tapping screws 32 which engage said flange 30. This shielding plate 31 is of substantially heavy construction, and is centrally apertured, as at 33, in a circular manner to permit rapid or "flash" heating of a small circular area of an object structure 34 (FIGURE 2) which is undergoing test, while the remainder of such object structure 34 is shielded by plate 31 and is not exposed to the "flash" when heat lamps 22 are momentarily energized. In this manner, a very substantial temperature differential (usually on the order of 500° F.) may be readily achieved between the heated area and unheated portions of the object structure 34, due to the rapidity of temperature rise and the relatively short duration of lamp energization.

A combination handle and coolant air duct is provided in the form of a longitudinally extending tubular construction 35 (FIGURES 1, 3 and 4) to afford portability for heater unit 10. Construction 35 includes a U-shaped handle portion 36, substantially centrally located on housing 14 of heater unit 10, so that unit 10 is essentially well-balanced to minimize operator fatigue. Handle 36 terminates at one end in a flanged fitting 37 (FIGURE 1), closed to the passage of air. Fitting 37 is adapted to provide means for the attachment of handle 36 to housing 14 in a conventional manner, and further, lends stability to the attachment of such a tubular construction 35 to housing 14. The opposite end of handle 36 extends along the upper surface of housing 14 nearly to the end thereof, and is attached thereto with suitable clips 38 in a conventional manner. Tubular construction 35 then passes through an aperture in the top of housing 14 and terminates in an integral downwardly depending tubular portion 39 (FIGURES 3 and 4), which is located inside housing 14 immediately adjacent a louvered end plate 18. Tubular portion 39 (FIGURE 4) extends nearly to flange 30 of housing 14, and is closed at its lower end 40. A plurality of vents 41 (FIGURES 3 and 4) are provided at various levels in tubular portion 39, extending radially through the wall thereof, so as to direct the flow of coolant air through housing 14 in a substantially uniform manner. A conventional air line coupling 42 of an air supply line 43 is suitably connected to the tubular construction 35 at the forward end of its handle 36 (FIGURE 1), adjacent fitting 37, for the supply of coolant air to construction 35. This arrangement permits the flow of coolant air, assuming sufficient pressure, through handle 36 so that handle 36 may be constantly maintained in a relatively cool state. Subsequent (continuous) air flow into tubular member 39 and through vents 41 serves to rapidly cool the heater unit 10 and heated portion of the object test structure 34 after each usage, the louvered end plates 18 permitting escape of said coolant air, so that consecutive operations of heater unit 10 may be readily achieved with a minimum time lapse between operations.

A junction box 44 (FIGURE 1) is mounted on the upper forward end of heater unit 10, adjacent handle 36, by a suitable means and houses electrical control devices for operation of heater unit 10. The control circuit embodying the control devices for heater unit 10 is shown in FIGURE 7. Thermal insulation 45 is provided between junction box 44 and heater unit 10 to insulate box 44 from heat developed within housing 14. The control devices for heater unit 10 includes a conventional manually-operated single-pole single-throw toggle switch 46 (FIGURES 1 and 7) which serves as a system "on-off" safety switch. Also included is a conventional manually-operated, push-button type, normally open limit switch 47 which serves as an initiating switch, and the operating button thereof extends through the top of junction box 44 immediately adjacent handle 36 (FIGURE 1) in a position convenient to an operator, in such manner that this button may be readily depressed while the operator is grasping handle 36. A usual plug 48 is included in the control circuit (FIGURE 7) of heater unit 10 and is adapted to engage a socket 49 of a timing circuit (the 24-volt) circuit shown in FIGURE 6 and heater to be described, so that when toggle switch 46 is closed, depression of the button of limit switch 47 closes normally open switch 47 to complete the circuit and subsequently energize heat lamps 22 (FIGURE 3). Similarly, a usual plug 50 of the heater lamp circuit (FIGURE 8a or 8b) is adapted to engage a socket 51 of the power circuit (the 440-volt circuit in FIGURE 6). The aforementioned circuitry will be later described in detail.

Referring to FIGURE 1, electrical energy for the lamp and control circuits is supplied to heater unit 10 through a cable 52, which connects to junction box 44 at 53 in a conventional manner. Although 12-lamp and 18-lamp circuits are respectively illustrated by FIGURES 8a and 8b, it is obvious that only one such circuit is employed in any particular heater unit 10 dependent upon the particular requirements of a work task to be performed. Cable 52 is adapted to carry two circuits, the 2-wire control circuit (FIGURE 7) and the 4-wire lamp circuit (either FIGURE 8a or FIGURE 8b). For convenience, plugs 50 and 48 (FIGURES 8a and 7, or FIGURES 8b and 7) are combined in the form of a conventional 6-pin electrical connector plug 54 (FIGURE 1), which is adapted for attachment to a matching socket (not shown) within control unit 11 in a conventional manner.

Still having reference to FIGURE 1, control unit 11 is shown to be housed in a case 55 having a hinged cover 56 and means 57 for latching cover 56 in closed position. A chassis-mounted panel 58 within case 55 has various control elements mounted thereon: (a) conventional power control switches 59 and 60, and a group of indicator or pilot lights indicated generally by the numeral 61, and which are individually designated by the reference characters 61a throufh 61f in FIGURE 6; and (b) adjustable timing cams 62 and 63, and conventional limit switches 64, 65 and 66, which are more fully illustrated by FIGURE 5. These electrical components shown in FIGURE 1 will be later described in the explanation of the circuitry contained within control unit 11, which is illustrated in FIGURE 6.

Referring now to FIGURE 5, there is illustrated a preferred timing mechanism, in which the portion of control unit 11 containing the timing cams 62 and 63 and limit switches 64, 65 and 66 is shown. The lower cam 62 co-operates with limit switches 64 and 65, while upper cam 63 coacts with limit switch 66, to control the duration of energization of heat lamps 22. It is desirable to provide rotational adjustment between cams 62 and 63, so that the duration of such lamp energization may be varied as required. Cams 62 and 63 are substantially identical in their peripheral configuration and have essentially the same degree of eccentricity. The lower cam 62 embodies an integral upwardly disposed cylindrical boss 67, concentric with its axis of rotation, which is adapted to engage a mating circular aperture 68 in upper cam 63 in a close-fitting but freely pivotable relationship. The underside of cam 63 embodies a semi-annular recess 69, concentric with and adjacent aperture 68 therein, which is adapted to accommodate the outer end of a radially extending pin 70 pressed into the lower portion of boss 67 on cam 62. In this manner, cams 62 and 63 are mechanically limited in their rotational adjustment with respect to each other, so that preset minimum and maximum timing intervals cannot be exceeded, which in the present instance varies from 0.5 second to 3.5 seconds. (This adjustment is shown in FIGURE 5 as being set for a "flash" duration of approximately 1.08 seconds.) A pair of diametrically opposed positioning lock bolts 71 serve to lock cams 62 and 63 in fixed relationship for any particular time setting. Bolts 71 engage axially extending threaded recesses (not shown) in boss 67, adjacent the edge thereof, and washers 72 are provided under the heads of bolts 71 so as to overlap the line of demarcation between boss 67 and cam 63. The height of boss 67 is slightly less than the thickness of upper cam 63, so that as bolts 71 are tightened, a clamping action is effected upon cam 63 in a conventional manner. A radially extending index mark 73 is provided on the upper surface of boss 67, adjacent the edge thereof, while the upper face of cam 63 is calibrated and marked with radially extending graduations 74 adjacent aperture 68 therein. In this manner, cams 62 and 63 may be rotatably positioned with respect to each other to control the duration of heat lamp energization, by setting the desired graduation 74 opposite index mark 73 in a conventional manner. Time intervals of one second are designated by numerals 75 on the face of cam 63, these intervals being further divided or subdivided into any convenient number of graduations 74, such as tenths of seconds, as shown in FIGURE 5.

The lower cam 62 (FIGURE 5) is preferably driven by a suitable electric motor 76 (FIGURE 6), which in the present embodiment of the invention is a 10 r.p.m. synchronous motor operating on a 115-volt circuit, so that cams 62 and 63 (FIGURE 5) are driven through 60° of arc per second, in a clockwise manner as indicated by arrow 77. Cam 62 is mounted on a motor shaft 78 in a conventional manner. Limit switch 66 is raised substantially above the surface of panel 58, to horizontally align with the working surface of upper cam 63, so that the operating lobe of lower cam 62 may pass beneath the actuating arm of limit switch 66. Limit switches 64 and 65 are mounted adjacent the surface of panel 58, horizontally aligned with the working surface of lower cam 62, so that the operating lobe of upper cam 63 may pass above the actuating arms of limit switches 64 and 65 without operating them. It should be apparent that the calibration of graduations 74 on upper cam 63 is dependent upon the location and spaced relationship of limit switches 64, 65 and 66.

The control unit 11 is provided with a 30-ampere, 4-wire, 3-phase, 440-volt power supply, as shown in FIGURE 6, one lead being grounded in a conventional manner. The triple-pole single-throw switch 59 (FIGURES 1 and 6) is provided as a primary system "on-off" switch, the power circuit being equipped with series-wired protective fuse elements 79, 80 and 81 (FIGURE 6) in a conventional manner. Pilot lights 61a, 61b, and 61c, wired in parallel across switch 59 and fuse elements 79, 80 and 81, serve to indicate "power on" when switch 59 is closed. An auxiliary 2-wire circuit, wired in parallel with the main power supply outside switch 59 and provided with protective fuse elements 82 and 83, terminates at a step-down transformer 84 to provide power to the 76 motor circuit at 115 volts. This 115-volt circuit is provided with the double-pole single-throw "on-off" switch 60 (FIGURES 1 and 6), and a parallel-wired pilot light 61f (FIGURE 6) to indicate "power on" in the 76 motor circuit when switch 60 is closed. Another step-down transformer 85 is wired in parallel in the 115-volt motor circuit to provide power to the timing circuit at 24 volts. A normally closed limit switch 86, wired in series with one lead to socket 49 (to which is connected the control circuit shown in FIGURE 7), is provided within the 24-volt timing circuit (FIGURE 6) as a safety switch, so that when cover 56 of control unit 11 (FIGURE 1) is closed, limit switch 86 (FIGURE 6) opens to break the timing circuit so that heat lamps 22 cannot be energized.

Plug 50 of the lamp circuit (FIGURE 8a or 8b) is connected to socket 51 of the power circuit (FIGURE 6), and plug 48 of the control circuit (FIGURE 7) is connected to socket 60 of the timing circuit (FIGURE 6). As the normally open limit switch 47 (FIGURE 7) is closed (by depressing the button on junction box 44 as shown in FIGURE 1) to complete the circuit, with safety switch 46 (FIGURE 7) in the closed position, current passes through the normally closed safety limit switch 86 (FIGURE 6) to energize a relay coil 87, which closes contactors 88 and 89. Closing contactor 89 completes the 115-volt circuit to energize motor 76, which drives the lower cam 62 (FIGURE 5) clockwise, thus releasing limit switch 64 (FIGURES 5 and 6) from the actuated (open) position to its normally closed position (FIGURE 6). At this time (approximately one-half second after closing limit switch 47), the actuating button of limit switch 47 may be released. Relay coil 87 remains energized after limit switch 47 is opened, due to limit switch 64 and contactor 88 being closed.

The operating lobe of lower cam 62 (FIGURE 5) next actuates the normally open limit switch 65 to momentarily close limit switch 65 and energize a relay coil 90 (FIGURE 6), which closes a pair of contactors 91 and 92. As contactor 92 is closed, two relay coils 93 and 94 are energized, which in turn closes a pair of contactors 95 and 96 to complete the 440-volt circuit and energize heat lamps 22, since the lamp circuit (FIGURE 8a or 8b) is connected to this 440-volt power circuit through plug 50 and socket 51 (FIGURE 6) as heretofore mentioned. As contactors 95 and 96 close, pilot lights 61d and 61e are energized to indicate "power on" in the 440-volt circuit to socket 51, and hence, to the lamp circuit (FIGURE 8a or 8b). As the lower cam 62 (FIGURE 5) the actuated (closed) limit switch 65 is released to its normally open position (FIGURE 6). Relay coil 90 remains energized through contactor 91 and normally closed limit switch 66 being closed, and consequently, contactor 92 remains closed, relay coils 93 and 94 remain energized, and contactors 95 and 96 remain closed.

The operating lobe of upper cam 63 next actuates normally closed limit switch 66 (FIGURES 5 and 6) to momentarily open limit switch 66 and de-energize relay coil 90 (FIGURE 6), which opens contactors 91 and 92, and which in turn de-energizes relay coils 93 and 94, to open contactors 95 and 96, which de-energizes heat lamps 22 (FIGURE 8a or 8b). As the upper cam 63 continues to rotate, the actuated (open) limit switch 66 (FIGURES 5 and 6) is released to its normally closed position in preparation for the next cycle. The lower cam 62 next actuates the normally closed limit switch 64 (FIGURES 5 and 6) to open said limit switch 64 and de-energize relay coil 87 (FIGURE 6), which opens contactors 88 and 89; contactor 89 being opened de-energizes motor 76 to stop the cams 62 and 63, thus completing the cycle.

De-energization of motor 76 (FIGURE 6) stops the lower cam 62 (FIGURE 5) in a position which holds the normally closed limit switch 64 open, in preparation for the next cycle. If the cover 56 of control unit 11 (FIGURE 1) is closed, the normally closed safety limit switch 86 (FIGURE 6) is actuated to open position so that relay coil 87 cannot be energized, and hence, contactor 89 remains open so that motor 76 cannot be energized to drive cams 62 and 63 (FIGURES 1 and 5); consequently, heat lamps 22 (FIGURE 8a or 8b) cannot be energized. These heat lamps 22 are parallel and series connected in a conventional manner, as a convenience in utilizing a 440-volt power supply, due to the relatively large power requirements of the plurality of lamp elements 22.

Prior to actual test operation with the apparatus of the present invention, certain prerequisites must be complied with. Inasmuch as the satisfactory operation of such apparatus is predicated upon the duration of heat lamp energization to test any particular object structure, certain standards must be established for reference. The preferred practice, such as when testing sandwich panel constructions, is to construct a standard panel structure or comparator 12 (FIGURE 1) which serves as a calibration means, of identical materials and face plate gauges as those of the object structure to be tested, so that the comparator 12 and object test structure embody substantially identical thermal characteristics (as conductivity, rate of heat absorption, etc.). For example, if an object structure of sandwich construction having .010 inch thick stainless steel face plates is to be tested, then the calibration specimen 12 employed to determine the duration of heat lamp energization must also be constructed with .010 inch thick stainless steel face plates. The duration of heat lamp energization or "flash" time is then determined experimentally by observing the time necessary to bring the calibration panel 12 to the desired temperature, which is essentially a comparative method insofar as the determination of duration of lamp energization is concerned.

FIGURE 1 illustrates a typical set-up for a calibration operation, in which heater unit 10 and control unit 11 are employed in conjunction with a calibration specimen 12 and temperature recording device 13. This temperature recording device 13 is a conventional instrument and is employed only for calibration purposes, and is not utilized in an actual test operation on an object structure. In the preferred calibration method, a conventional chromel-alumel thermo-couple (not shown) is attached to the facing plate of calibration panel 12 to measure the temperature rise. A thermocouple lead 97 is shown in FIGURE 1 as being connected at 98 to a temperature recording device 13. A convenient method of thermocouple attachment to calibration panel 12 which has proven satisfactory is the spot-welding method. In this method, such point of attachment is provided with a thin film of dielectric, such as may be readily effected by marking the face plate with a grease pencil (as a commercially available China marking pencil), and the ball of the thermocouple placed on this mark. A capacitor bank of approximately 5,200 microfarads is charged to 350 volts and allowed to discharge through thermocouple lead 97 and the thermocouple to the grounded calibration panel 12, to effect intimate contact of the thermocouple with the facing plate of calibration panel 12. The ball of said thermocouple should be attached to panel 12 at a point directly over the center of a core cell, rather than over a cell node, since the former is the point of maximum temperature. Attachment of the thermocouple to the face plate of structure 12 directly over a cell junction or node will result in an erroneous temperature indication, of approximately 75° F. lower when said face plate of calibration panel 12, at the center of a core cell, is heated to 600° F. No material of any kind should be applied to the ball of said thermocouple, in attaching same to panel 12 or otherwise, since this would tend to shield the thermocouple from heat lamps 22, or vary the thermal conductivity from calibration panel 12 to the thermocouple, and result in an erroneous temperature indication on the recording device 13.

The duration of "flash" time is experimentally set by rotational adjustment of cams 62 and 63 with respect to each other as heretofore described, the heater unit 10 then positioned on calibration panel 12 (with the aperture 33 in shield 31 centered on the ball of the thermocouple), and heat lamps 22 energized in the manner thus described. The temperature variations in the test area of the calibration panel's face plate prior to, during, and after such lamp energization are charted in a conventional manner on the temperature recorder 13. As shown in FIGURE 1, the substantially vertical portion of the recorded temperature plot 99 represents room or ambient temperature prior to lamp energization, the quasi-horizontal portion of plot 99 represents the rapid temperature rise during the momentary lamp energization, while the curved portion of plot 99 indicating a decrease in temperature represents the cooling cycle after such lamp energization, effected by the continuous flow of coolant air through heater unit 10 as heretofore described. If the peak temperature of plot 99 is above or below the desired temperature level, timing cams 62 and 63 are readjusted with respect to each other, by setting a numerically lower or higher graduation 74 opposite index mark 73, to respectively decrease or increase the duration of such heat lamp energization. Once this duration of lamp energization or "flash" time has been experimentally determined by employing such a calibration panel 12 to effect a desired (controlled) temperature rise, object structures comprised of identical materials and face plate gauges as the calibration specimen 12 may be tested with assurance that the temperature rise in the test area will be substantially identical to that heretofore effected in the comparator 12 and accurately measured with a thermocouple.

Figure 2:
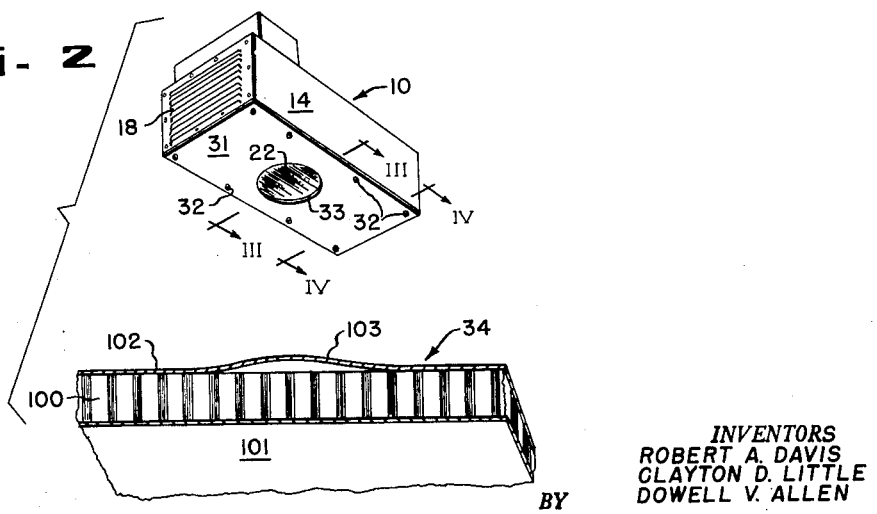
FIGURE 2 is a perspective view illustrating the underside of the heater unit of the present apparatus and a fragmentary sectional view through a typical sandwich panel construction, exemplifying joint failure by delamination.

Generally, such as in testing stainless steel sandwich-type object structures, operating temperatures in the test area of approximately 600° F. are desirable, to effect a differential between ambient and peak temperatures of approximately 520° F. Such a differential will induce thermal compressive stresses of approximately 40,000 p.s.i. in the test area of the face panel of the object structure undergoing test, which is substantially below the yield point of the material being tested (heat treated stainless steel in this instance), but sufficient to cause a poorly brazed face panel to become delaminated from its core. This is best illustrated in FIGURE 2, wherein a typical sandwich-type object structure 34 comprising a cellular core material 100 faced with relatively thin plates 101 and 102 is shown as having undergone such a test. This particular object structure 34 is shown to have failed, as indicated by the protuberant portion 103 of face plate 102, which has been caused to become delaminated from the core 100 by "flash-heating" the test area of face plate 102. Such "flash-heating" will induce sufficient thermal compressive stresses in the test area of an object structure's face plate 102 to effect such delamination if a low-quality joint is existent in said object structure 34 undergoing test. Heavier gauge face plates generally require longer "flash" periods to attain the same temperature level as thinner face plates with their associated "flash" periods of shorter duration. However, higher temperatures, such as up to 1,000° F. (or more) may be readily effected without substantially reducing the material properties of certain structures; this permits other possible applications for "flash-heating," such as limit stress "proof-testing" in some structural configurations, as heretofore mentioned.

Having reference again to FIGURE 1, the heated (circular) test areas are designated by the reference character 104. With respect to the calibration structure 12 shown herein, these areas 104 are not strictly "test areas," but may be more accurately described as "comparative test areas," since the function of structure 12 is to essentially serve as a calibration means or comparator as thus described. However, such areas 104 shown on calibration structure 12 serve to illustrate a typical "test pattern" which would actually be effected on the surfaces of an object structure undergoing test procedures. Since the portion of an object test structure adjoining a heated area 104 becomes slightly warmer than ambient or room temperature during lamp energization, but not nearly as hot as test area 104, this adjoining portion should be permitted time to cool to room temperature before testing again in the same general vicinity. Consequently, a staggered or random sequence of testing should be employed, which will range the surface of the object structure undergoing test to eventually complete a regular pattern as shown in FIGURE 1, but in a manner of "skipping around" with heater unit 10, so that no test area 104 is immediately adjacent another area 104 just tested. In this manner, the portion of structure adjoining each test area 104 is thus permitted time to essentially return to room temperature, so that in each test instance on any particular object structure undergoing test, substantially the same temperature differential may be attained between the heated area 104 and unheated portion of such structure. The general region of this heated area 104 is manifested in FIGURE 2 by the extent of the protuberant portion 103 of facing plate 102. The areas of an object test structure to be "flash-heated" by this apparatus should be clean to prevent surface discoloration, so that the test areas 104 are actually not readily visible, although they are so indicated in FIGURE 1 for purposes of clarification.

FIGURE 9 exemplifies a fragment of a typical object structure 34 to be tested, in which the geometry involved in the calculation of thermally induced stresses in the face plate 102 thereof is schematically represented. The heated test area 104 of face plate 102 is preferably a circular area of radius "$a$"; unit area or point B represents any portion of facing plate 102 within the heated area 104, while unit area or point A represents any portion of facing plate 102 outside the heated area 104, at a distance "$r$" from the center thereof. FIGURE 10a schematically represents the principal stresses acting upon any point A outside the heated test area 104, the radial stresses $\sigma_r$ being compressive, while the tangential stresses $\sigma_t$ are tensile, but equal in magnitude to the compressive stresses. Similarly, FIGURE 10b schematically represents the principal stresses acting upon any point B within the heated test area 104, in which the radial and tangential stresses $\sigma_r$ and $\sigma_t$ are both of a compressive nature and equal in magnitude. A typical calculation to determine the induced thermal compressive stresses within a heated test area 104 of a facing plate is herein given, in which:

$E$ = Modulus of elasticity of material = $29.25 \times 10^6$
$\alpha$ = Linear coefficient of thermal expansion of material = $5.5 \times 10^{-6}$
$T$ = Peak temperature of facing plate within heated area = 600° F.
$RT$ = Room temperature, or ambient temperature = 80° F.
$\Delta T$ = Temperature differential between heated and unheated areas = 520° F.
$\sigma_r$ = Radial compressive stress
$\sigma_t$ = Tangential compressive stress $$\sigma_r = \sigma_t = \tfrac{1}{2} \Delta T \alpha E \tag{1}$$
$$\sigma_r = \sigma_t = \tfrac{1}{2}(520)(5.5 \times 10^{-6})(29.25 \times 10^6)$$
$$\sigma_r = \sigma_t = 41{,}800 \text{ p.s.i.}$$

The results of this typical calculation are graphically represented in FIGURE 11, in which the induced thermal stresses in such a heated test area 104 are plotted against temperature.

The temperature differential $\Delta T$ is essentially determined by the duration of lamp energization or "flash" time, but is further affected by the number and arrangement of heater lamps 22 employed in any particular heater unit 10, the lamp wattage, and ambient or room temperature. It should be readily apparent that a great number of temperature differentials $\Delta T$ may be effected in the employment of the present apparatus, any particular temperature differential $\Delta T$ being selected on the basis of the structural character and composition of the object bonded, brazed, or welded composite structure undergoing test procedure.

Other objects and features of the present invention will be readily apparent to those skilled in the art from the following specification and appended drawings wherein is illustrated a preferred form of the invention, and in which what we claim is:

1. A heating device for testing the integrity of a composite sandwich structure comprising a substantially rectangular housing having an open side, heating means comprising a plurality of infra-red electrical lamps, a reflector cooperating with said infra-red lamps, ceramic support means supporting said lamps and said reflector in cooperating relationship and mounting said reflector and said infra-red lamps in said housing facing said open side, a planar heat shield fastened to said open side, said planar heat shield having a central aperture enabling radiation therethrough by said infra-red lamps, control means connected to said infra-red lamps, said control means comprising an initiating switch, interval timing switch means, relays having coils connected in circuit with said initiating switch and said interval timing switch means and having circuit-closing contacts in circuit between said infra-red lamps and a source of current, a cooling duct fastened to said housing having a portion thereof on the exterior of said housing forming an operator's handle and a portion within said housing having a plurality of apertures for directing cooling air through said housing, and means connecting said cooling duct to a source of compressed air.

2. A heating device for testing the integrity of a composite sandwich structure comprising a substantially rectangular housing having an open side, heating means comprising a plurality of infra-red electrical lamps, a reflector cooperating with said infra-red lamps, ceramic support means supporting said lamps and said reflector in cooperating relationship and mounting said reflector and said infra-red lamps in said housing facing said open side, a planar heat shield fastened to said open side, said planar heat shield having a central aperture enabling radiation therethrough by said infra-red lamps, control means connected to said infra-red lamps, said control means comprising an initiating switch, interval timing switch means, relays having coils connected in circuit with said initiating switch and said interval timing switch means and having contacts in circuit between said infra-red lamps and a source of current, a tubular cross-section cooling duct fastened to said housing having a rectangular portion thereof on the exterior of said housing forming an operator's handle and a portion within said housing having a plurality of apertures for directing a stream of cooling air through said housing, and means connecting said cooling duct to a source of compressed air.

3. A heating device for testing the integrity of a composite sandwich structure comprising a substantially rectangular housing having an open side, heating means comprising a plurality of infra-red electrical lamps, a reflector cooperating with said infra-red lamps, ceramic support means supporting said lamps and said reflector in cooperating relationship and mounting said reflector and said infra-red lamps in said housing facing said open side, a planar heat shield fastened to said open side, said planar heat shield having a central aperture enabling radiation therethrough by said infra-red lamps, control means connected to said infra-red lamps, said control means comprising a low voltage control circuit including an initiating switch, interval timing switch means, and relay coils connected in circuit with said initiating switch and said interval timing switch means and a high voltage power circuit including said infra-red lamps and relay contacts in circuit between said infra-red lamps and a source of current, a cooling duct fastened to said housing having a portion thereof on the exterior of said housing forming an operator's handle and a portion within said housing having a pluralilty of apertures for directing cooling air through said housing, and means connecting said cooling duct to a source of compressed air.

References Cited in the file of this patent

UNITED STATES PATENTS

| 1,932,703 | Mancuso | Oct. 31, 1933 |
|---|---|---|
| 2,059,835 | Worthing et al. | Nov. 3, 1936 |
| 2,223,331 | Roesch et al. | Nov. 26, 1940 |
| 2,303,873 | Anderson | Dec. 1, 1942 |
| 2,364,730 | Leskin | Dec. 12, 1944 |
| 2,386,319 | Johnson | Oct. 9, 1945 |
| 2,555,416 | Marano | June 5, 1951 |
| 2,694,135 | Brockmole | Nov. 9, 1959 |